(12) United States Patent
Jungnickel et al.

(10) Patent No.: US 9,793,930 B2
(45) Date of Patent: Oct. 17, 2017

(54) USING LTE-A TRANSMITTERS AND CARRIER AGGREGATION IN BOREHOLE COMMUNICATION

(71) Applicant: Fraunhofer-Gesellschaft zur Foerderung der angewandten Forschung e.V., Munich (DE)

(72) Inventors: Volker Jungnickel, Berlin (DE); Miguel Gutierrez, Berlin (DE); Udo Krueger, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/885,862

(22) Filed: Oct. 16, 2015

(65) Prior Publication Data

US 2016/0043753 A1 Feb. 11, 2016

Related U.S. Application Data

(63) Continuation of application No. PCT/EP2014/056921, filed on Apr. 7, 2014.

(30) Foreign Application Priority Data

Apr. 17, 2013 (EP) .................................. 13164192

(51) Int. Cl.
*H04B 1/04* (2006.01)
*E21B 47/16* (2006.01)
*H04L 5/00* (2006.01)

(52) U.S. Cl.
CPC ............... *H04B 1/04* (2013.01); *E21B 47/16* (2013.01); *H04L 5/001* (2013.01); *H04L 5/0007* (2013.01); *H04L 5/0064* (2013.01)

(58) Field of Classification Search
CPC ......... H04B 1/04; H04L 5/001; H04L 5/0007; H04L 5/0058; H04L 5/0064; H04W 72/0453; E21B 47/16
USPC ................ 375/260, 295; 455/500, 507, 509; 370/477
See application file for complete search history.

(56) References Cited

U.S. PATENT DOCUMENTS 7,042,367 B2 * 5/2006 Gardner ................. G01V 11/00
340/853.3
7,200,070 B2 * 4/2007 Hall ........................ E21B 47/12
340/853.3

(Continued)

OTHER PUBLICATIONS

Bendin, Ralf et al., "Embracing LTE-A with KeyStone SoCs", White Paper, Texas Instruments, Oct. 11, 2012, 16 pages.

(Continued)

*Primary Examiner* — Betsy Deppe
(74) *Attorney, Agent, or Firm* — Michael A. Glenn; Perkins Coie LLP

(57) ABSTRACT

In a method, an apparatus and a system for data transmission, a plurality of transmitters are provided, which operate according to a communications standard for data transmission with a bandwidth that is higher than the transmission bandwidth. The transmitter is adapted to the transmission bandwidth, and the plurality of the adapted transmitters are allocated to different carrier frequencies in the transmission bandwidth for parallel data transmission.

13 Claims, 9 Drawing Sheets

(56) References Cited

U.S. PATENT DOCUMENTS

| | | | |
|---|---|---|---|
| 2010/0002795 A1* | 1/2010 | Raghavan | H04L 27/2601 375/265 |
| 2010/0128813 A1* | 5/2010 | Abbasfar | H04L 5/06 375/295 |
| 2012/0106674 A1* | 5/2012 | Lee | H04L 5/001 375/296 |

OTHER PUBLICATIONS

Guitierrez, M.A., "Acoustic broadband communications over deep drill strings using adaptive OFDM", 2013 IEEE Wireless Communications and Networking Conference (WCNC)., Apr. 7-Apr. 10, 2013, pp. 4089-4094.

Guitierrez, M.A., "Vibrationen aus der Tiefe-Wie neue Mobilfunktechniken helfen, grosse Datenmengen in kurzerer Zeit akustisch uber einen Bohrstrang zu ubertragen", DGMK/OGEW-Fruhjahrstagung 2013, Fachbereich Aufsuchung und Gewinnung, 18., Apr. 18, 2013, 10 pages.

Jungnickel, Volker et al., "Anwendung der neuesten Mobilfunktechniken auf akustische Wellen zur Verbesserung der Kommunikation in der Tiefbohrtechnik", DGMK/OGEW-Fruhjahrstagung 2012, Fachbereich Aufsuchung und Gewinnung, Apr. 19, 2012, 10 pages.

Manolakis, K , "Borehole Communication with Acoustic OFMD", International OFDM-Workshop 2011, Germany 2011, 4 pages.

Memarzadeh, M , "Optimal Borehole Communication Using Multicarrier Modulation", Ph.D. Thesis Jan. 2007, 94 pages.

Reeves, M.E. et al., "High Speed Acoustic Telemetry Network Enables Real Time Along Measurements, Greatly Reducing Drilling Risk",SPE Offshore Europe Oil and Gas Conference and Exhibition held in Aberdeen, UK, Sep. 6-8, 2011, 12 pages.

* cited by examiner

USING LTE-A TRANSMITTERS AND CARRIER AGGREGATION IN BOREHOLE COMMUNICATION

CROSS-REFERENCE TO RELATED APPLICATIONS

This application is a continuation of copending International Application No. PCT/EP2014/056921, filed Apr. 7, 2014, which claims priority from European Application No. EP 13164192.0, filed Apr. 17, 2013, which are each incorporated herein in its entirety by this reference thereto.

The present invention relates to the field of communications engineering and here in particular to the field of data transmission with a predefined transmission bandwidth via a predefined channel, and, in particular, the present invention relates to approaches for adaptation of known transmission methods configured for respective bandwidths to the predefined transmission bandwidth without changing the actual transmission method.

BACKGROUND OF THE INVENTION

Different data transmission approaches are known in conventional technology that are conventionally designed to allow data transmission via a channel in a predetermined frequency range (bandwidth). In conventional technology, different transmission methods exist that are used in the context of wired or wireless channels. Exemplarily, reference is made to the DAB standard (digital audio broadcasting), the DVB-T standard, the WLAN standard or the different mobile radio standards (e.g. LTE). Wired standards comprise, for example, the ADSL standard or the VDSL standard. In these known transmission approaches, transmitters/receivers are provided which operate according to the provisions of the standard in a specific frequency range and are implemented for that purpose.

Known transmission methods that are used in the above-stated approaches comprise, for example, the OFDM approach (orthogonal frequency-division multiplexing), where several orthogonal carriers are used for digital data transmission, wherein the payload information to be transmitted with a high data rate is at first split into several sub-data streams and these sub-data streams are then separately modulated and transmitted. Transmit devices implementing the above-mentioned standards and using the OFDM method are adapted to the specific frequency range where the same are to be used as well as to the multiple-path propagation found in the typical application scenarios. For applications where the use of a channel is to be performed according to one of the above-stated standards, the known transmit devices can easily be used.

In situations where the channel characteristics are different to those defined for the above-mentioned standards, for example a data transmission of one or several sensors to a central detection location at low frequencies, wherein the transmission is optimized for a different channel, it is common in conventional technology up to now to newly develop and structure transmit/receive devices adapted to the channel, which is accompanied by a significant effort with respect to development costs and development time.

SUMMARY

According to an embodiment, a method for data transmission with a transmission bandwidth may have the steps of: providing a plurality of transmitters operating according to a communications standard for data transmission with a bandwidth that is higher than the transmission bandwidth; and adapting the transmitters to the transmission bandwidth; wherein adapting the transmitters includes reducing the bandwidth of the transmitters to a subrange of the transmission bandwidth by reducing the clock rate of the transmitters; wherein a plurality of the adapted transmitters is allocated to different carrier frequencies in the transmission bandwidth for parallel data transmission.

Another embodiment may have a computer program product with instructions stored on a computer-readable medium for performing the method according to claim 1, when the instructions are performed by a computer.

According to an embodiment, an apparatus for data transmission with a transmission bandwidth may have: a plurality of transmitters operating according to a communications standard for data transmission with a bandwidth that is higher than the transmission bandwidth, and that are adapted to the transmission bandwidth, wherein the transmitters are adapted by reducing the bandwidth of the transmitters to a subrange of the transmission bandwidth by reducing the clock rate of the transmitters; and a control; wherein the control that is effective to allocate a plurality of the adapted transmitters to the transmission bandwidth at different carrier frequencies in the transmission bandwidth for parallel data transmission.

According to an embodiment, an system for data transmission may have: a transmission channel; an apparatus according to claim 10 for data transmission on the transmission channel; and a receiver for receiving the data transmitted via the transmission channel.

According to advantageous embodiments, the transmitters operating according to the standard for data transmission operate with a bandwidth which is, at first, higher than the transmission bandwidth. The sampling rate of all transmitters is adapted to the desired transmission bandwidth, whereby the length of the cyclic prefix is adapted to the desired channel. The data signals are distributed to the adapted transmitters, which realize parallel data transmission at different sub-carrier frequencies within the desired transmission bandwidth.

According to embodiments, adapting the transmitters includes reducing the bandwidth of the transmitters to a fraction of the desired transmission bandwidth.

According to embodiments, adapting the individual transmitters comprises reducing the clock rate.

According to embodiments, the data are transmitted via a channel with amended channel characteristics in the desired transmission bandwidth, and the number of transmitters operated in parallel and their individual bandwidth is adapted until the channel characteristics allow reliable data transmission. In this case, the method can comprise the following steps:
- determining the channel characteristic of the channel, for example the length of the impulse response;
- selecting the number of transmitters allowing reliable data transmission; and
- allocating the data to the adapted transmitters operated in parallel on different sub-carriers within the transmission bandwidth.

According to embodiments, the data transmission includes OFDM data transmission.

According to embodiments, the data transmission comprises data transmission via an acoustic channel. The acoustic channel can include a drill rods, at the end of which a drill head and adjacent to the drill head a sensor as well as a transmit means are arranged, wherein the data transmission comprises data transmission of sensor data to above ground.

According to embodiments, data transmission includes data transmission via a wireless connection (radio link) of a radio system at a frequency that is lower than an operating frequency of the non-adapted transmitter. The radio system can connect one or several sensors and/or actuators with respectively allocated transmitter and/or receiver device to a central detection location.

The present invention provides a computer program product with instructions that are stored on a computer-readable medium for performing the inventive method when the instructions are performed by a computer.

The present invention provides an approach allowing data transmission by using known transmitters operating according to a communications standard while maintaining the basic structure of the known transmitter, in particular the transmission method used by the transmitter, and merely scaling of the transmitter is effected, so that the bandwidth at which the transmitter operates is adapted to a channel bandwidth of the available channel. According to the invention, for avoiding transmission problems due to the specific characteristics of the used channel, it is further suggested to arrange several of the adapted transmitters in the bandwidth of the channel (at different carrier frequencies) to allow parallel data transmission via the plurality of transmitters, which prevents negative influences of the channel on the transmission method.

According to advantageous embodiments of the invention, the transmission method used in the transmission uses an OFDM method for transmitting the data, wherein advantageously a transmitter operating according to the LTE mobile radio standard and implementing at least the LTE PHY layer and the LTE link layer (in the following also referred to as LTE transmitter) is used, which has, however, been scaled with respect to the lower bandwidth of the available channel. According to embodiments, the clock rate of the LTE transmitter can be reduced by a predetermined factor, which results in the reduced bandwidth matching the desired channel bandwidth. During the allocation of the transmitters adapted in this manner within the bandwidth of the channel, a respective shift of the carrier frequency of the LTE transmitter to a frequency within the channel bandwidth is effected.

The inventive approach is particularly advantageous for applications where the available channel makes data transmission with high bandwidth more difficult. By the inventive usage of the OFDM method as suggested according to embodiments, in connection with the provision of several adapted transmitters that operate according to the transmission method, data transmission with increased data rate is enabled in the channel band without the necessity of developing and constructing new transmitters adapted to the specific channel, but rather, a known transmitter is scaled in order to be adapted to the lower bandwidth, and subsequently several transmitters are distributed across the channel bandwidth.

According to an advantageous embodiment of the invention, this approach is used in sensor networks connected via a radio system operating at a carrier frequency that lies, for example, significantly below the frequency at which an LTE transmitter normally operates, for example in the range below 700 MHz, where earlier broadcast and television frequencies will be used in future for operating mobile radio networks. According to the present invention, for example, the original LTE transmitter is scaled to operate in the new frequency range without changing the transmission technology, which means, in the context of the OFDM method, merely that all times around the scaling factor become longer, but the basic LTE frame structure is maintained. Thus, by using the well established and well functioning LTE-OFDM transmission approach, scaled to the lower frequency, fail-safe and reliable data transmission is enabled, even with channels where data transmission would be difficult due to changing channel characteristics.

A further advantageous field of use of the inventive approach is in the field of drilling technology, more precisely in the field of acoustic transmission of seismic data from a drill head to above ground, for example for controlling the drill path. According to this embodiment, the channel is formed by the drill rods, at the distal end of which a drill head is arranged, to which one or several sensors are allocated for detecting seismic data. Further, a transmitter according to the inventive approach is provided which allows, via the channel formed by the drill rods, data transmission in the above-described manner to a receiver positioned above ground. Embodiments of the invention allow, for example, data transmission with a data rate of several 100 bits/s from the drill head to the surface, for example across a depth of 2000 m.

BRIEF DESCRIPTION OF THE DRAWINGS

Embodiments of the present invention will be detailed subsequently referring to the appended drawings, in which:

FIG. 2 shows the LTE carrier aggregation approach, wherein FIG. 2(a) shows the inventive carrier aggregation with a constant bandwidth and wherein FIG. 2(b) shows the known LTE carrier aggregation approach;

FIG. 6 shows the frequency response of the channel of FIG. 4 for different wave types and for different depths, wherein FIG. 6(a) shows the frequency response of the channel for a longitudinal acoustic wave for different lengths of the drill string, and wherein FIG. 6(b) shows the frequency response of the channel for a transversal acoustic wave for different lengths of the drill string;

DETAILED DESCRIPTION OF THE INVENTION

In the following description of the advantageous embodiments, the same or equal elements are provided with the same reference numbers.

Figure 1:
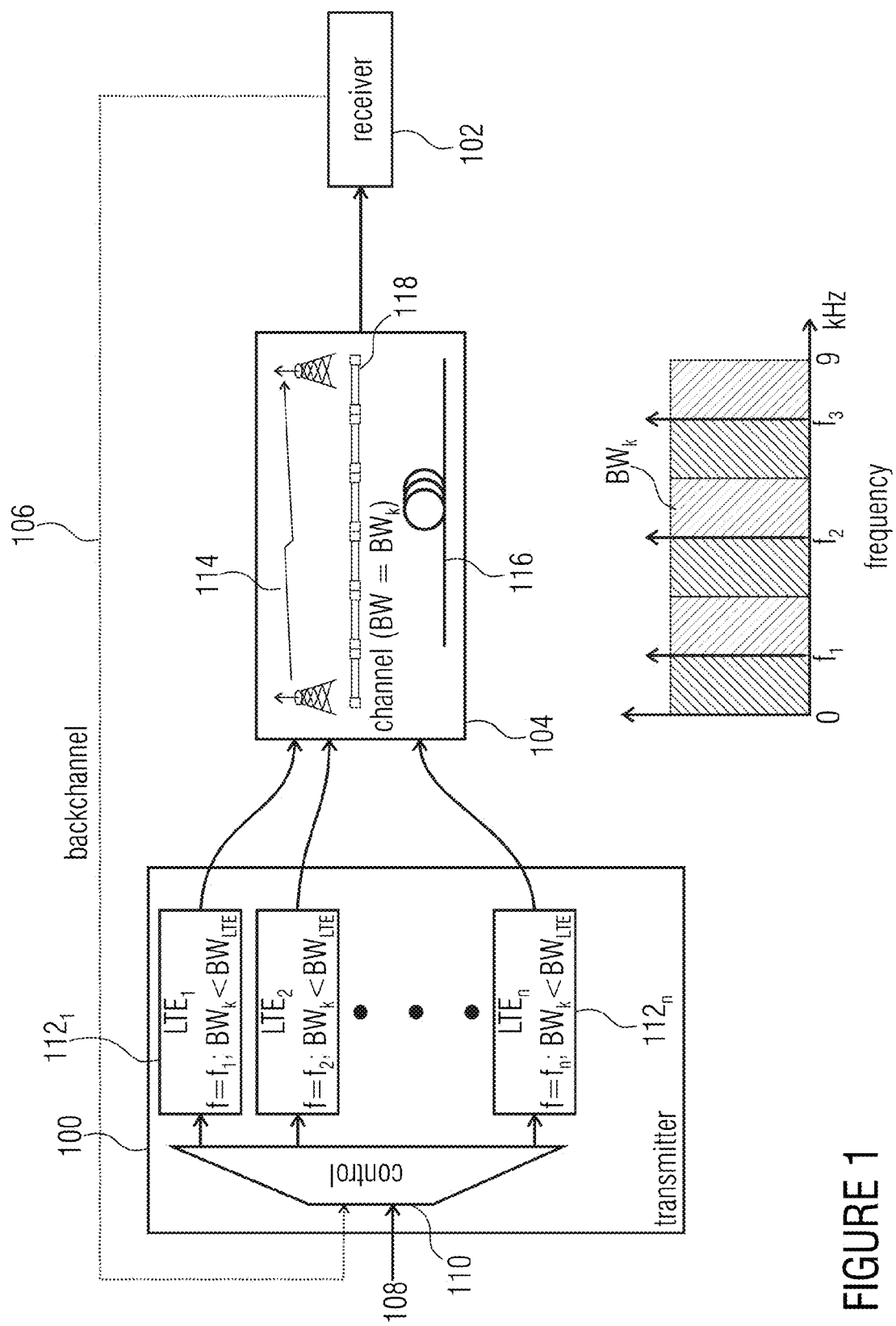
FIG. 1 shows a schematic illustration of a system for data transmission according to the teachings of the present invention.

FIG. 1 shows a schematic illustration of a system for data transmission according to the teachings of the present invention. The system shown in FIG. 1 comprises a transmitter 100 operating according to the inventive method or implemented according to the inventive apparatus. Further, the system includes a receiver 102 as well as a channel 104 via which the signals, for example data signals 108, are transmitted from the transmitter 100 to the receiver 102. According to embodiments, a backchannel 106 can be provided separately from the channel 104 to return an estimation of the channel characteristics based on the signals received at the receiver 102 to the transmitter 100 for controlling the transmission. In other embodiments, instead of the separate backchannel, the channel 104 can also be used as the backchannel.

The transmitter 100 receives the data to be transmitted, as indicated schematically by arrow 108, for example from a sensor. The transmitter 100 includes a control 110 and a plurality of transmit units $112_1$ to $112_n$. In the embodiment shown in FIG. 1, the transmit units $112_1$ to $112_n$ include transmitters that operate according to the LTE communications standard, e.g. transmitters that implement at least the LTE PHY layer and the LTE link layer (in the following also referred to as LTE transmitter). According to the LTE communications standard, data transmission is performed by means of the LTE transmitter according to the OFDM method, wherein the LTE transmitter is implemented for a frequency range as defined by the LTE communications standard. The channel 104 connecting the transmitter 100 and the receiver 102 can have different implementations, for example the channel 104 can comprise a radio channel 114, a wired channel 116 or an acoustic channel 118. The channel 104 provides, for example, a bandwidth $BW_K$ of approximately 10 kHz for data transmission in the field of deep drilling technology, wherein the channel is in this case an acoustic channel 118 provided by drill rods. FIG. 1 shows, below the channel 104, the frequency range of 0 to 9 kHz provided by the channel according to an embodiment.

According to the invention, the LTE transmitters are adapted such that their bandwidth corresponds to the channel bandwidth $BW_K$ of the channel 104. According to embodiments, this is performed by reducing the clock rate and shifting the carrier frequency, whereby an OFDM signal having a bandwidth of, for example, 10 kHz can be generated. According to the present invention, in the bandwidth $BW_K$ provided by the channel, several of the adapted LTE transmitters $112_1$ to $112_n$ are provided for parallel data transmission. In the embodiment illustrated in FIG. 1, an adapted LTE transmit unit is provided for the frequencies $f_1$ and $f_2$ within the frequency band of 0 to 9 kHz shown in FIG. 1, which transmit the received data 108 according to the LTE transmission method via the channel 104 in the direction of the receiver 102. Here, it should be noted that the adapted LTE transmit units, as mentioned, are adapted to the channel bandwidth $BW_K$ in the shown case to 9 kHz, but the two LTE units used for parallel data transmission with the bandwidth $BW_K$ operate at different carrier frequencies $f_2$ and $f_3$. The data signals are then distributed to the adapted transmitters which realize parallel data transmission at the different sub-carrier frequencies $f_2$ and $f_3$ within the transmission bandwidth. In other embodiments, the LTE transmitters can be adapted to a sub-area of the transmission bandwidth $BW_K$. According to embodiments, the transmitters operating according to the communications standard for data transmission operate with a bandwidth which is at first higher than the transmission bandwidth. The adaptation of the transmitters is performed by an adaptation of the sampling rate of all transmitters to the desired transmission bandwidth, whereby the length of the cyclic prefix is adapted to the desired channel.

Via the backchannel 106, it can be determined, for example by evaluating the signals arriving at the receiver 102, in which frequency ranges the channel 104 comprises channel characteristics allowing reliable data transmission. This information can be returned to the control 110 of the transmitter 100, which is then able, based on the received information on the channel characteristics in different frequency ranges, to make a choice, namely a choice as to which sub-carrier frequencies within the desired transmission bandwidth are the data signals to be distributed for parallel data transmission.

Further, in embodiments, based on the detected channel characteristics of the channel provided for data transmission, the number of transmitters operated in parallel and their individual bandwidth can be adapted until the channel characteristics allow reliable data transmission. In this case, first, the channel characteristic of the channel can be determined, for example the length of the impulse response. Subsequently, the number of transmitters allowing reliable data transmission is selected. The data are then assigned or allocated to the adapted transmitters operated in parallel on different sub-carriers within the transmission bandwidth for parallel data transmission.

Figure 2:
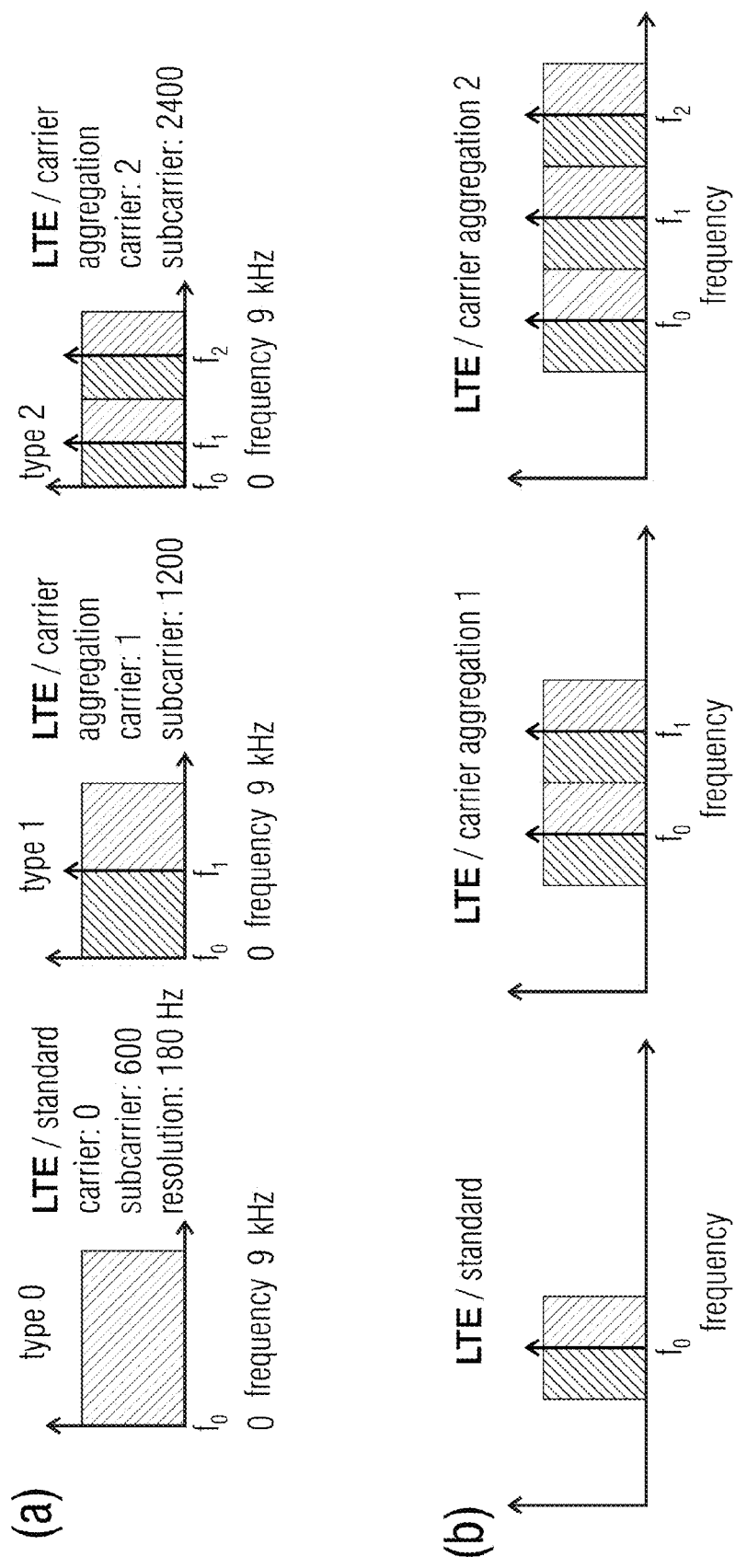

The inventive approach as schematically described above based on FIG. 1 is advantageous for channels 104, where due to the channel characteristics the spectral resolution and the length of a guard interval as provided according to the OFDM method is not sufficient to allocate sufficient bandwidth for data transmission in the transmission spectrum of the channel. Thus, according to the invention, an approach is used which models the LTE carrier aggregation approach. This will be discussed in more detail below based on FIG. 2. FIG. 2(a) explains the inventive carrier aggregation within a constant bandwidth, and FIG. 2(b) explains the known LTE carrier aggregation approach. In FIG. 2(b), the first figure shows functionality according to the LTE standard without carrier aggregation. Data transmission is performed within the bandwidth around the carrier $f_0$. If additional bandwidths within the spectrum are released, then, according to the LTE carrier aggregation approach, the data rate can be increased by increasing the bandwidth by adding one or more additional LTE transmission systems operating at the frequencies which are allocated to the released frequency bands, so that in the case of the LTE carrier aggregation 1 shown in FIG. 2(b), parallel data transmission via two carriers $f_0$ and $f_1$ can be performed, and for an LTE carrier aggregation 2 a parallel data transmission via three carriers $f_0$, $f_1$ and $f_2$.

According to the invention, the known carrier aggregation approach is used, but, contrary to the LTE standard, the data rate is not increased by increasing the bandwidth but the carrier aggregation approach is introduced, according to the invention, within a constant bandwidth, namely the constant bandwidth $BW_K$ provided by the channel, so that instead of or in addition to the base band LTE signal several carrier LTE signals are arranged within the same bandwidth. FIG. 2(a) shows, on the very left, an approach where an adapted LTE unit without carrier aggregation is provided for transmission via the channel 104 with the bandwidth $BW_K$ equal to 9 kHz. According to the invention, as explained above, at $f_0$, one or several additional LTE signals with the carrier frequencies $f_1$ or $f_2$ are provided within the 9 kHz band for parallel data transmission, in addition to or instead of the base band signal. As can be seen from FIG. 2(a), compared to the standard approach, this results in an increase of the used sub-carriers, an improvement of the frequency resolution and allows the usage of a larger guard interval when using an additional carrier. When using two additional carriers, the number of used sub-carriers and also the resolution in the frequency range are increased accordingly. Further, even longer guard intervals are possible.

In the following, embodiments in which the inventive approach for data transmission described above with respect to FIG. 1 and FIG. 2 is used will be discussed in more detail.

Figure 3:
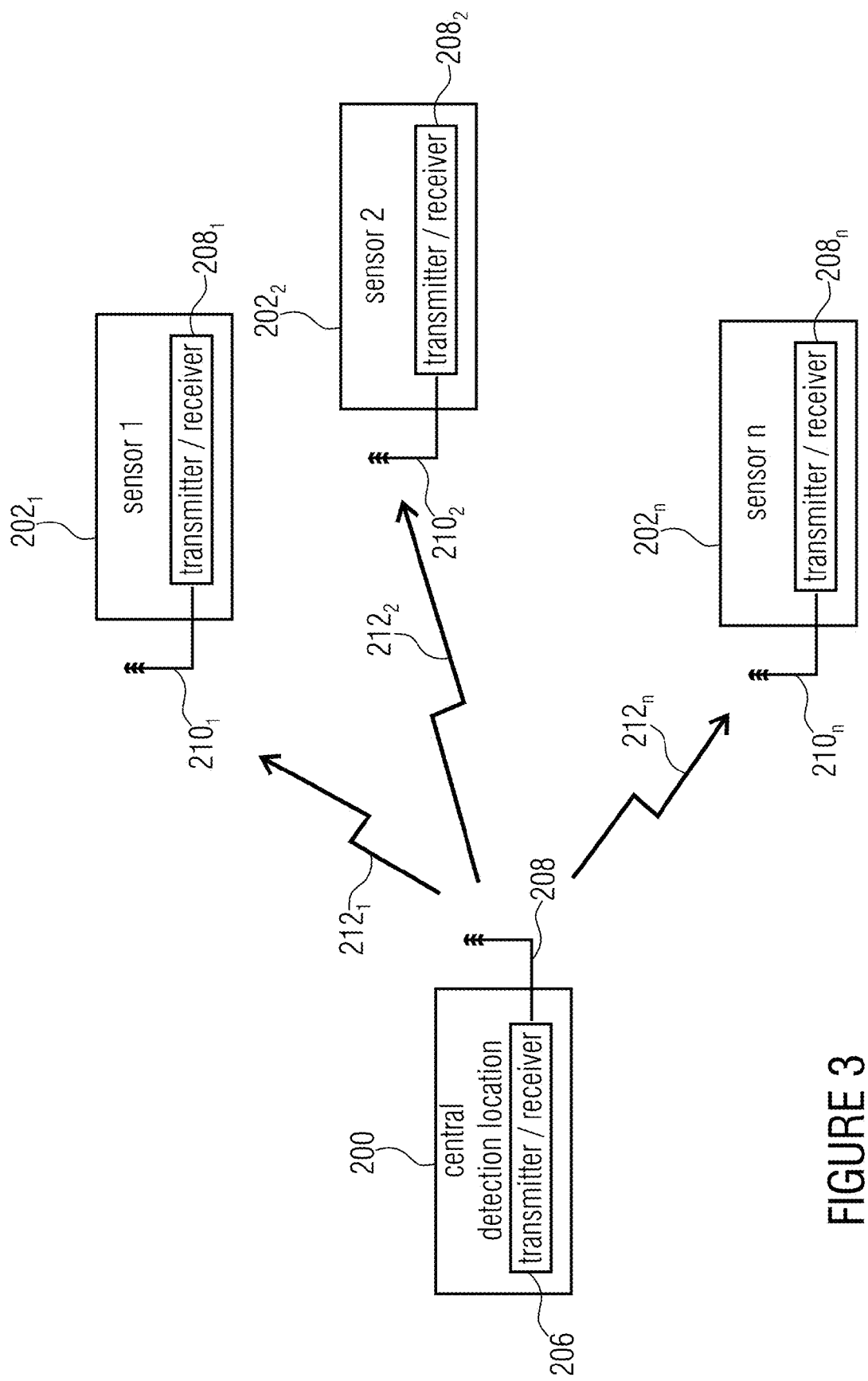
FIG. 3 shows a schematic illustration of a sensor network where data transmission is performed according to the teachings of the present invention.

FIG. 3 shows a schematic illustration of a sensor network where data transmission is performed according to the teachings of the present invention. FIG. 3 shows a central detection location 200 which serves to receive sensor signals from a plurality of sensors $202_1$ to $202_n$. The central detection location 200 can, for example, be a central control unit detecting environmental parameters via sensors $202_1$ to $202_n$ at different locations of an environment, for example a house, in order to effect, if possible, in response to the detected sensor signals, regulation or control of actuators or the output of information signals. The central detection location 200 includes a transmitter/receiver 206 connected to an antenna 208 and operating according to the teachings of the present invention as discussed above. Each of the sensors $202_1$ to $202_n$ also includes a transmitter/receiver assembly $208_1$ to $208_n$, which are also connected to respective antennas $210_1$ to $210_n$. In the example shown in FIG. 3, the channel is formed by a radio channel, as is shown schematically by the arrows $212_1$ to $212_n$. Alternatively, also other, for example wired connections can be provided between the sensors and the detection location 200. Acoustic connections are also possible, for example via a water pipe system inside a building, along which the sensors are arranged at different positions, which return, for example, information on the pressure, temperature or throughput amount at the specific position to the location 200. The transmitters/receivers of the sensors and the detection location 200 communicate by using the above-described approach and allow, despite the low bandwidth of the available channel, data transmission with a high data rate by using the known LTE transmit units.

Here, it should be noted that FIG. 3 shows a sensor network, but the present invention is not limited to this. For example, additional actuators can be provided that communicate with the detection location 200 in the inventive manner in order to be controlled according to the detected sensor signals. Pure actuator networks are also possible, in which case the sensors according to FIG. 3 would have to be replaced by respective actuators. Further, transmission in the inventive manner is also possible between individual sensors or actuators.

In the following, a further advantageous embodiment of the present invention will be discussed in more detail, according to which the inventive approach is used for acoustic waves for improving the communication in deep drilling technology. Underground use of high-resolution seismic methods for pinpoint control of the drill direction is performed by data transmission with high data rates to above ground. In conventional technology, approaches are known in the context of deep drilling technology to allow data transmission from below ground to above ground. In this regard, reference is made to the mud pulse approach which has the disadvantage that only a few bits per second can be transmitted. For increasing the data transmission rates, acoustic data transmission along the drill rods has been suggested, and for relatively narrowband modulated pulses having a bandwidth of less than 10 Hz, data rates of 33 bits/s are possible, as is described, for example, by M. E. Reeves, P. L. Camwell, J. McRory, "High Speed Acoustic Telemetry Network Enables Real Time Along String Measurements, Greatly Reducing Drilling Risk", Offshore Europe, UK, (2011). For transmitting large amounts of data, as they arise, for example, in seismic pre-explorations, this data rate is, however, not sufficient. Increasing the data rate can only be obtained with significantly more broad-band signals, wherein the problem here, however, is the highly frequency-selective behavior of the drill string. The large amount of rod connectors cause a ragged transmission frequency response having many pass and stop bands, which means that on some frequencies no data can be transmitted at all, while transmission on other frequencies functions well.

Figure 4:
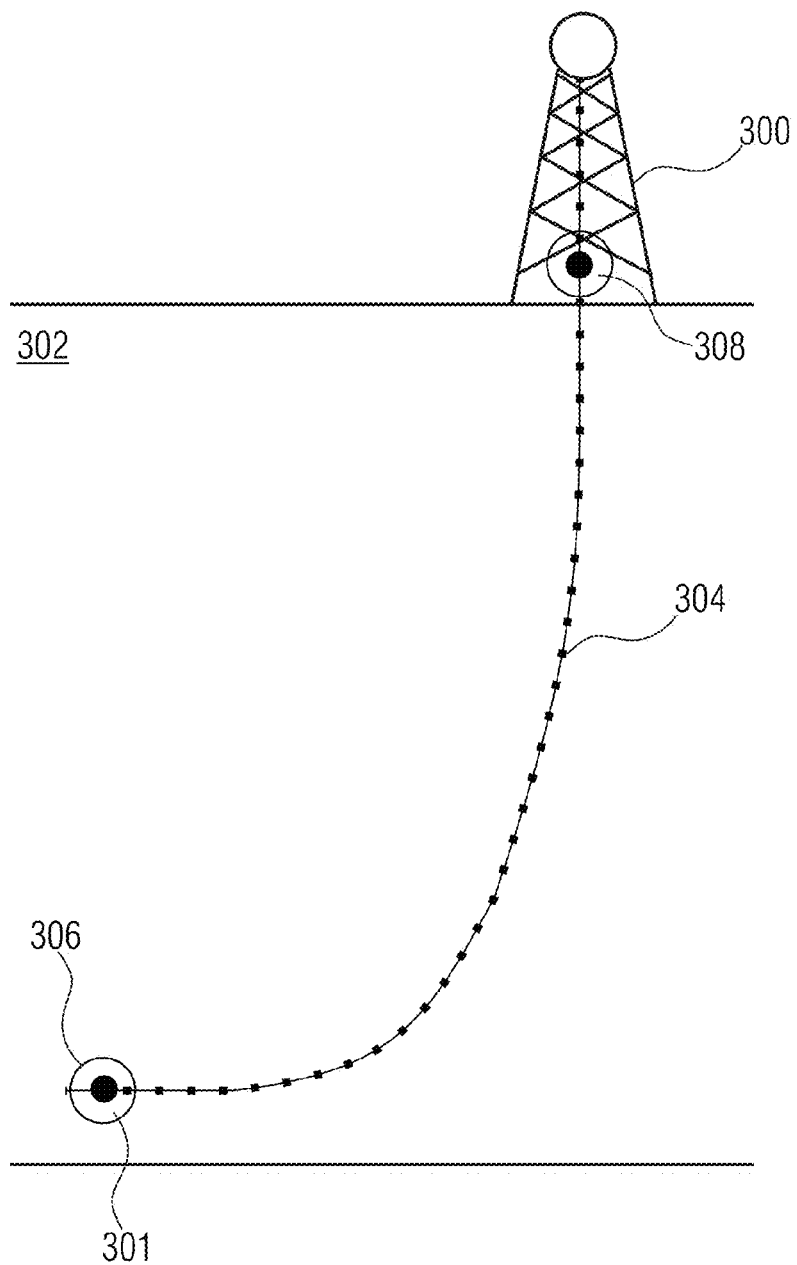
FIG. 4 shows a simplified illustration of a drill hole communications system.

FIG. 4 shows a simplified illustration of a drill hole communication system. A drill tower 300 is provided to perform drilling below ground 302. By means of a drill head 301, a drill hole is driven into the underground 302, wherein the drill head is situated at the front end of a drill string 304 comprising drill rods with a plurality of connected drill rods. On the drill head, a transmitter 306 is arranged which operates according to the inventive approach and allows data transmission to a receiver 308 arranged above ground. According to the invention, using the OFDM standard enables the signal to be composed of many sub-carriers ("sounds") which run independently of other sounds through the rods 304 from the transmitter 306 to the receiver 308. Thereby, the transmission in the drill rods 304, which are screwed together in many places, can be made robust against the massive acoustic multiple-path propagation, and the better a specific transmission channels functions, the more data can be transported, as is already described in the context of short drill rods, by M. Memarzadeh, "Optimal Borehole Communication Using Multicarrier Modulation", Ph.D. thesis, Rice University, Houston, Tex., (2007).

Figure 5:
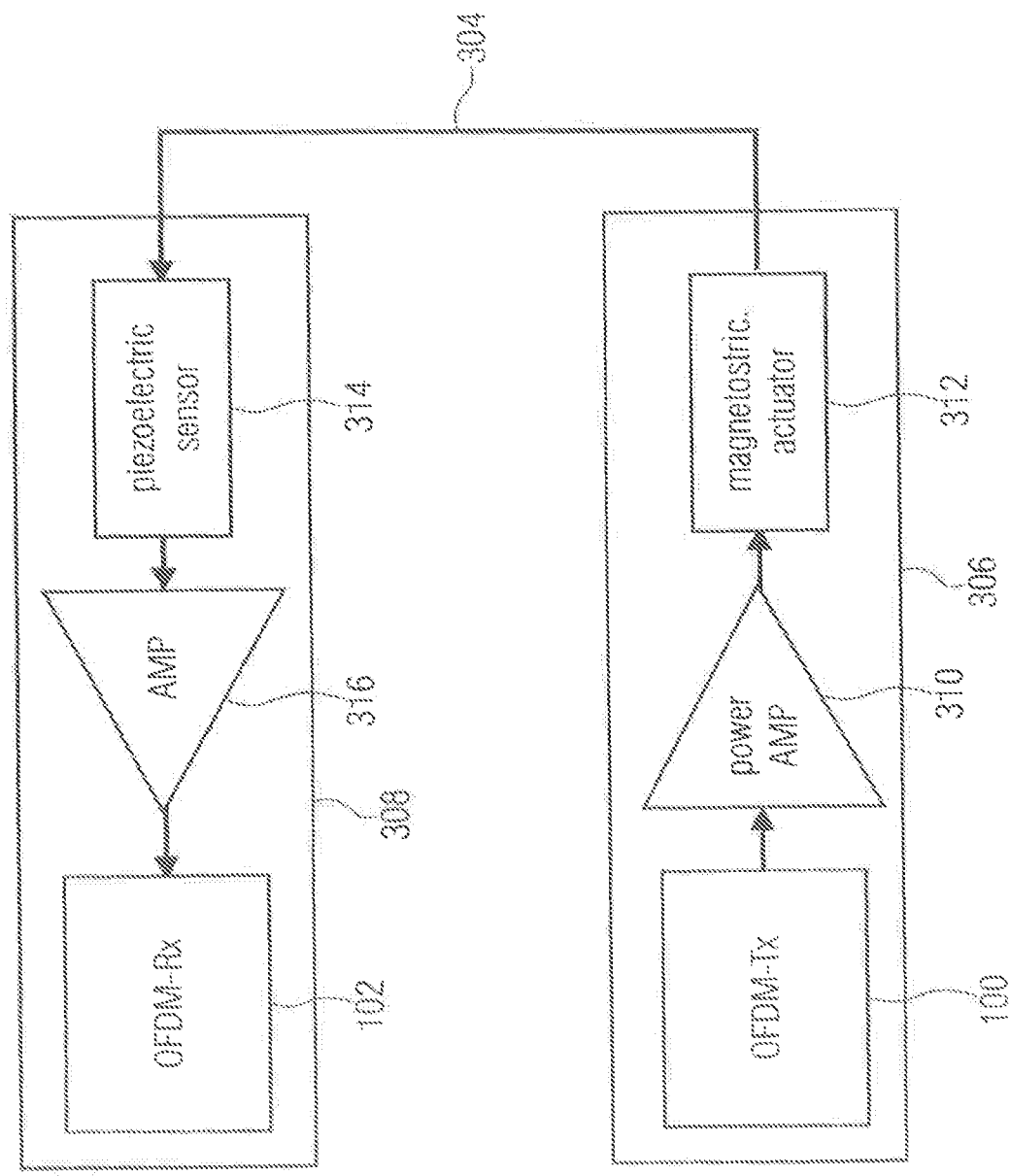
FIG. 5 shows a schematic illustration of the communication system shown in FIG. 4 including the OFDM processing for a transmission direction.

FIG. 5 shows a schematic illustration of the communication system shown in FIG. 4 including OFDM processing for a transmission direction. The transmitter 306 includes the inventive transmitter 100 as well as a power amplifier 310 in order to amplify the signals output by the transmitter 100 for control of a magnetostrictive actuator 312. The receiver 308 includes a piezoelectric sensor 314, and the signals detected by the same are amplified by the amplifier 316 and provided to the receiver circuit 102. The channel 104 shown in FIG. 1 is realized by the drill rods 304.

In the present embodiment, the data are transmitted by means of acoustic waves, and the waves are excited by means of the magnetostrictive actuator 312 arranged at one end of the drill string 304, and received by means of a piezo-sensor 314 at the other end of the drill string 304. Apart from the attenuation, the frequency response of the acoustic transmission channel 304 has many pass-band and barrier areas, so that, according to embodiments, an adaptive OFDM technology is used, similar to that in the LTE mobile radio system. The receiver 102 measures the frequency response of the channel 104 and informs the transmitter 100, for example via the backchannel 106 shown in FIG. 1. The transmitter can then transmit the data only in the pass-band regions, which is also referred to as a closed-loop transmission. Further, the modulation format and hence the number of bits per sub-carrier as well as the transmit power can be adapted to the quality of the transmission channel. A very noisy channel allows, for example, only a BPSK modulation (1 bit/sub-carrier) when a good channel also allows a 64-QAM modulation (6 bits/sub-carrier). Further, also, the known error correction approaches can be used, for example by adding redundant bits to the data, which allow, in cooperation with an interleaver, secure transmission of data with maximum data rate, even with contiguous burst errors in the channel.

According to embodiments of the present invention that are used in the context of deep drilling technology, actuators based on terphenol-D are used, a ferromagnetic material having one of the largest magnetostrictive effects, which is accompanied by strong hysteresis, which also causes a non-linear relationship between electric current and acoustic excitation. For an OFDM signal having many sub-carriers, the curvature of the characteristic curve causes cross-talk of the sub-carriers into one another, which causes additional inherent noise and limits the capacity of the transmission system. The piezoelectric sensor 314, which is effective as a receiver, is a less critical component, so that a mechanical resonance frequency can easily be placed above 10 kHz, so that the same has a constant frequency characteristic in the frequency range of interest with respect to acceleration. Advantageously, the receiver is placed close to the end of the drill rods.

According to advantageous embodiments, the above-mentioned transmit units (see transmit units 112 in FIG. 1) include LTE transmit units operating according to the LTE standard, which are, however, adapted for the application in the range of deep drilling technology, starting from a system bandwidth of, for example, 20 mHz. The LTE transmit units are advantageous due to their powerful and complex signal processing. For use in the above-described embodiment in the context of deep drilling technology, the LTE transmit unit is modified according to an embodiment, so that the same has a clock rate which is 1000 times lower, the carrier is shifted to 0 Hz and a complex conjugated mirror function is used, so that a real-valued OFDM base band signal having a bandwidth of 10 kHz can be generated. By using the LTE standard, the LTE frame structure is maintained, and the times are increased by a factor of 1000, i.e. a complete acoustic transmission frame now lasts 10 seconds instead of the 10 milliseconds with LTE, and is divided, as in LTE, into 10 sub-frames each lasting 1 second instead of one millisecond, which also define the smallest transmission unit, the so-called transmission time interval (TTI). In each TTI, 12 symbols are arranged in the time direction, and each symbol consists of 600 OFDM sub-carriers. All in all, 7,200 sub-carriers per sub-frame can be loaded with data, wherein, according to embodiments, on average approximately 5.5% are reserved for so-called pilots which are known in the receiver and allow, on the one hand, synchronization to the frame structure of the transmitter and, on the other hand, channel estimation which can be used, among other things, for distortion (see, e.g., K. Manolakis, U. Krüger, K. Krüger, M. A. G. Estévez, S. Mikulla, V. Jungnickel, "Borehole Communication with Acoustic OFMD", International OFDM Workshop 2011, Germany (2011)).

In the context of the above-stated embodiment regarding deep drillings, it has, however, been determined that the transmission using only one LTE unit modified in the above-described manner is not sufficient since the signals used for transmission, in particular for longer drill rods, are unsuitable due to the pulse spreading (delay spread) which can be up to 0.5 seconds, and further, the pass bands in the channel defined by the longer drill string become narrower and narrower so that exact adaptation of the used frequency bands may be employed.

For solving this problem, namely the too large pulse spreading and the too narrow pass bands, according to the invention, the extension of the LTE mobile radio standard referred to as LTE advanced, the so-called carrier aggrega-tion, is used. As mentioned above, here, according to conventional LTE connections, several of these connections are bundled in parallel as a transmission path, in order to thus realize, with increased sampling rate, a connection with increased data rate. The inventive approach uses this, but for a different purpose. According to the invention, the sampling rate is kept constant, which allows the operation of several LTE systems adapted in the above-described manner in the available bandwidth of, for example, 9 kHz, whereby a respectively prolonged OFDM guard interval (cyclic prefix) as well as a better spectral resolution in frequency allocation becomes possible.

Figure 6:
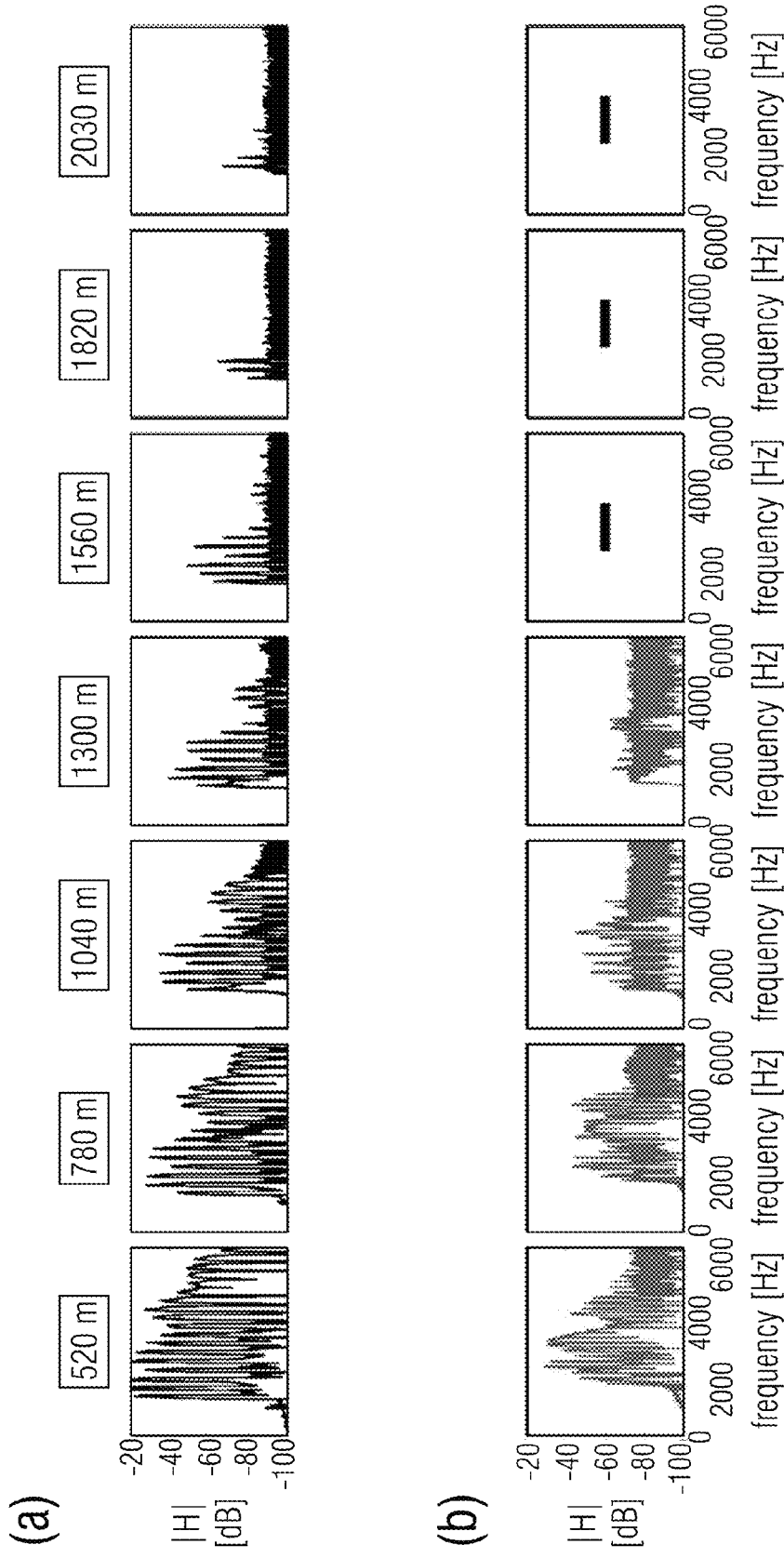

In the following, the advantages of the inventive approach are discussed based on simulation results, wherein the simulations are based on channel data obtained in the course of a field test at the continental deep drilling in Windisch-Eschenbach. Drill rods were measured at different depths (lengths), and for determining the channel characteristics the impulse response of the respective channel was obtained. A chip signal (sinus sweep with linearly increasing frequency) has been used, since this signal has almost perfect autocorrelation characteristics and hence the cross-correlation of the transmitted chip signal with the received signal results essentially in the impulse response of the channel (correlation receiver). Transmission characteristics of the drill rods can be determined by comparing the transmitted and received sinus sweep signals. By appropriately selecting the windows, again 10 to 20 dB distance to the noise can be obtained. This is advantageous, since the greater the distance between the payload signal and the noise signal, the more reliably the payload signals can be detected. An additional FFT provides the frequency response of the channel and FIG. 6 shows the frequency response for different wave types and for different depths. More exactly, FIG. 6(a) shows the frequency response of the channel for a longitudinal acoustic wave for different lengths of the drill string, and FIG. 6(b) shows the frequency response of the channel for a transversal acoustic wave for different lengths of the drill string. Based on the obtained realistic channel data, different LTE systems have been simulated for data transmission, wherein a distance between the payload signal and the noise signal (SNR) of 20 dB has been assumed. This distance was obtained during the measurement and longitudinal excitation up to a depth of 1,300 m. Data transmission is possible as long as the signals stand out from the noise of the receiver. Then, the same can be loaded with a QPSK with highest error encoding. At a signal amplitude of any size, the absolutely highest data rate is obtained, and for all frequencies 64 QAM is then possible and a bandwidth of approx. 34 kbits/s results as top limit.

Figure 7:
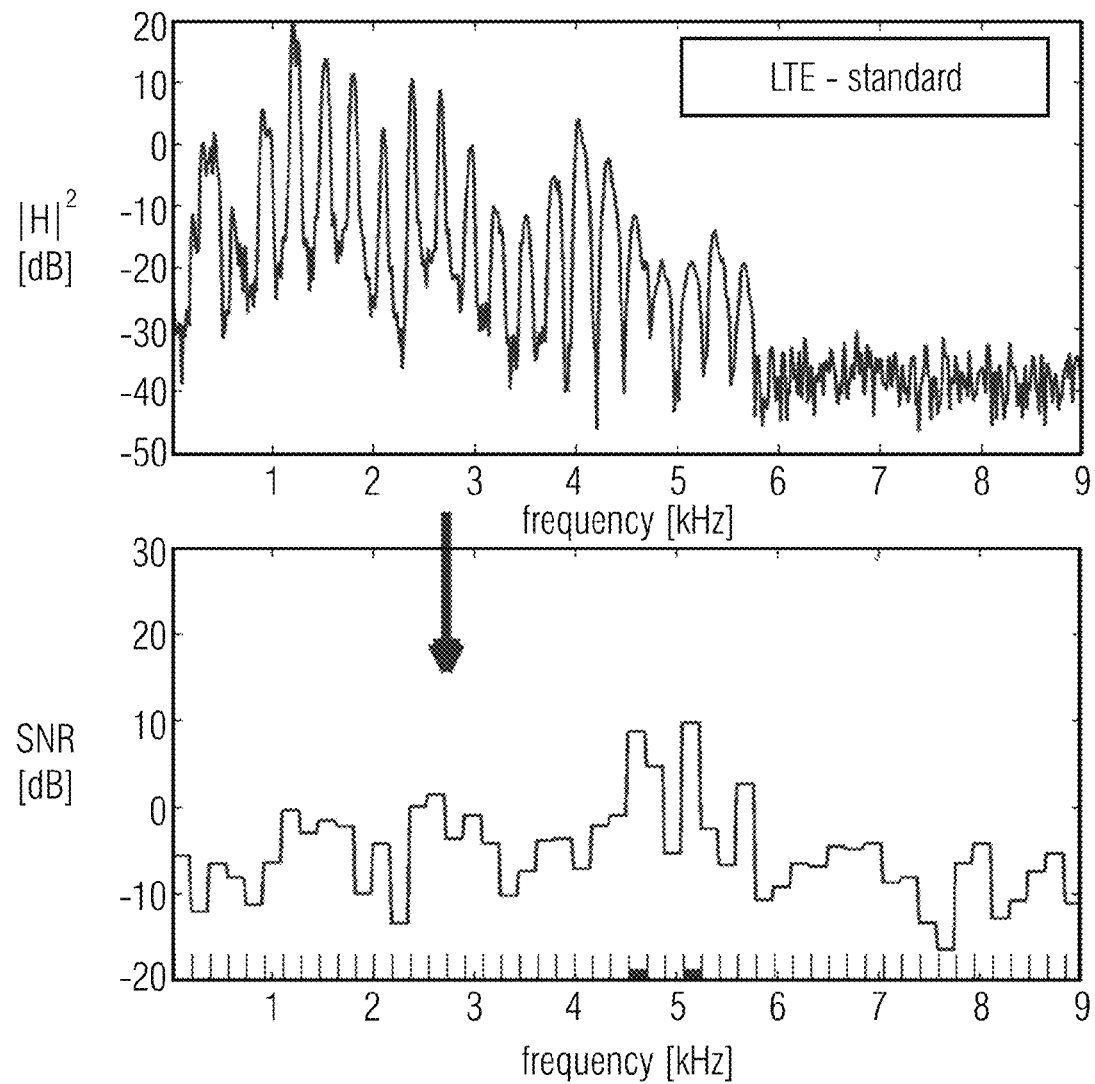
FIG. 7 shows an example of the spectral distribution of the SNR estimation for the standard LTE (94 bits/s)
Figure 8:
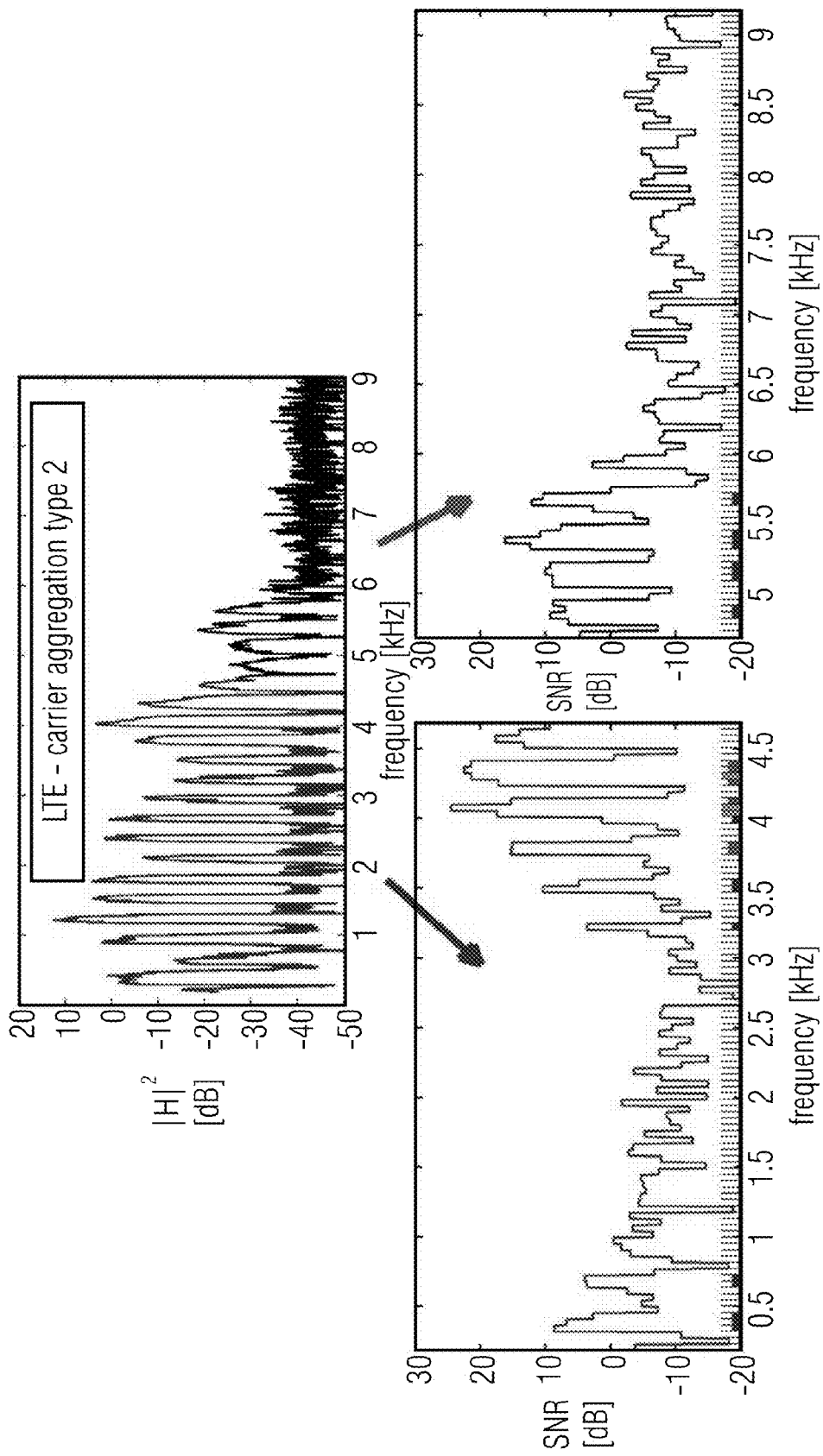
FIG. 8 shows the spectral distribution of the SNR estimation for LTE with carrier aggregation 2 (2,143 bits/s) with the same channel as for FIG. 7.
Figure 9:
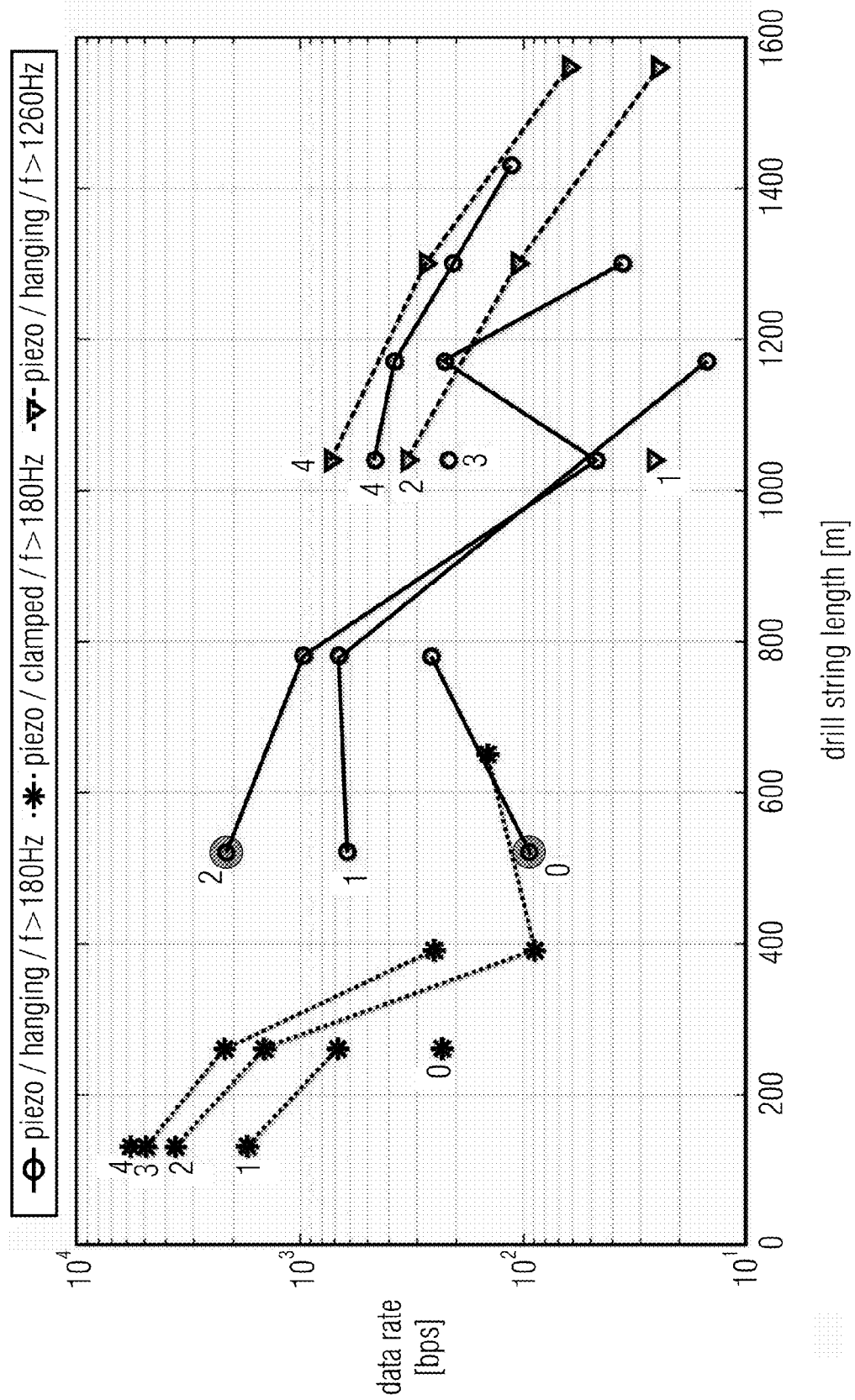
FIG. 9 shows simulated data rates with the respectively measured channel characteristics in dependence on the overall length of the drill string for different degrees of carrier aggregation.

According to embodiments, data transmission includes several steps. First, a so-called sounding signal is transmitted, with the help of which the distribution of the SNR across the frequency ranges can be estimated. This information is then retransmitted and results in an specification for loading the pass band with data, as is shown based on FIGS. 7 and 8. FIG. 7 shows an example of the spectral distribution of the SNR estimation for the standard LTE (94 bits/s). FIG. 8 shows the spectral distribution of the SNR estimation for LTE with carrier aggregation 2 (2,143 bits/s), wherein the top illustrations show the channels, which are basically the same, but are detected based on different sounding procedures and hence slightly deviate from each other. FIG. 9 shows simulated data rates with the respectively measured channel characteristics in dependence on the overall length of the drill string, wherein merely longitudinal waves have been considered, and the numbers 0 to 4 define the used LTE system, wherein the following applies: 0=standard LTE, 1 to 4=LTE with carrier aggregation type 1 to 4. The points between 400 and 600 m show the examples of FIGS. 7 and 8, wherein it further applies that for a frequency of f>180 Hz only the resource blocks below 180 Hz are occupied, and for f>1,260 Hz, only the resource blocks above 1,260 Hz are occupied.

As can be seen from FIG. 9, a maximum data rate of 5,700 bits/s results at a length of 130 m. At a length of the drill rods of 1.5 km, almost 100 bits/s could still be transmitted. At a length of 1 km, the data rate was approximately 700 bits/s. Thus, the data rates obtainable according to the inventive approach correspond approximately to 10 times the common mud pulse telemetries.

According to further embodiments, linearization of the actuators can be performed to provide higher transmit powers as well as a reduced portion of spurious harmonics and mixed frequencies. MIMO technologies also contribute to a further improvement of the data rate by using several actuators and receivers. On the receiver side, the SNR can be increased by signal-adapted amplification prior to A/D conversion.

While some aspects have been described in the context of an apparatus, it is obvious that these aspects also represent a description of the respective method, so that a block or member of an apparatus can also be seen as a respective method step or as a feature of a method step. Analogously, aspects described in the context of one or as a method step also represent a description of a respective block or detail or feature of a respective apparatus.

Depending on the specific implementation requirements, embodiments of the invention can be implemented in hardware or in software. The implementation can be performed by using a digital memory medium, for example a floppy disc, a DVD, a Blu-ray disc, a CD, an ROM, a PROM, an EPROM, an EEPROM or a FLASH memory, a hard disc or any other magnetic or optical memory on which electronically readable control signals are stored that can cooperate or that cooperate with a programmable computer system such that the respective method is performed. Thus, the digital memory medium can be computer-readable. Thus, some embodiments according to the invention include a data carrier comprising electronically readable control signals that are able to cooperate with a programmable computer system such that one of the methods described herein is performed.

Generally, embodiments of the present invention can be implemented as computer program product with a program code, wherein the program code is effective for performing one of the methods when the computer program product runs on a computer. The program code can, for example, also be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein when the computer program runs on a computer. A further embodiment of the inventive method is thus a data carrier (or a digital memory medium or a computer-readable medium) on which the computer program for performing one of the methods described herein is recorded.

Thus, a further embodiment of the inventive method is a data stream or a sequence of signals representing the computer program for performing one of the methods described herein. The data stream or the sequence of signals can be configured, for example, for being transferred via a data communication connection, for example via the internet.

A further embodiment comprises a processing means, for example a computer or a programmable logic device that is configured or adapted to perform one of the methods described herein.

A further embodiment comprises a computer on which the computer program for performing one of the methods described herein is installed.

In some embodiments, a programmable logic device (for example a field-programmable gate array, an FPGA) can be used to perform some or all functionalities of the methods described herein. In some embodiments, a field-programmable gate array can cooperate with a microprocessor to perform one of the methods described herein. Generally, the methods in some embodiments are performed by any hardware device. This can be universally usable hardware, such as a computer processor (CPU) or hardware specific for the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for data transmission over a transmission channel providing a channel bandwidth for the data transmission, comprising:
   providing a plurality of transmitters, each of the plurality of transmitters operating according to a communications standard for data transmission, the communications standard defining a data transmission bandwidth, the data transmission bandwidth being higher than the channel bandwidth; and
   adapting each of the plurality of transmitters such that the data transmission bandwidth of each transmitter corresponds to the channel bandwidth;
   wherein adapting each of the plurality of transmitters comprises reducing the data transmission bandwidth of each of the plurality of transmitters to a subrange of the channel bandwidth by reducing the clock rate of each of the plurality of transmitters; and
   wherein
   at least some of the adapted transmitters are allocated to different carrier frequencies in the channel bandwidth for a parallel data transmission.

2. The method according to claim 1, wherein the transmission channel has a changing channel characteristic in the channel bandwidth, and wherein one of the adapted transmitters is allocated to a carrier frequency if the channel characteristic of the carrier frequency allows reliable data transmission.

3. The method according to claim 2, comprising:
   determining the channel characteristic of the transmission channel and retransmitting the channel characteristic via a backchannel;
   selecting frequency ranges where the channel characteristic allows reliable data transmission; and
   allocating one adapted transmitter each to the selected frequency ranges.

4. The method according to claim 1, wherein the data transmission comprises an OFDM multi-carrier data transmission.

5. The method according to claim 1, wherein the transmission channel is an acoustic channel.

6. The method according to claim 5, wherein the acoustic channel comprises drill rods, at the end of which a drill head and adjacent to the drill head a sensor are arranged, wherein data transmission comprises data transmission of sensor data to above ground.

7. The method according to claim 1, wherein the transmission channel is a radio channel, the data transmission being at a frequency that is lower than an operating frequency of each transmitter operating according to the communications standard for data transmission.

8. The method according to claim 7, wherein the radio system connects one or several sensors and/or actuators to a central detection location.

9. A computer program product with instructions stored on a computer-readable medium for performing the method according to claim 1, when the instructions are performed by a computer.

10. An apparatus for data transmission over a transmission channel providing a channel bandwidth for the data transmission, comprising:
   a plurality of transmitters, each of the plurality of transmitters operating according to a communications standard for data transmission, the communications standard defining a data transmission bandwidth, the data transmission bandwidth being higher than the channel bandwidth, each of the plurality of transmitters adapted such that the data transmission bandwidth of each transmitter corresponds to the channel bandwidth, and each of the plurality of transmitters being adapted by reducing the data transmission bandwidth of each of the plurality of transmitters to a subrange of the channel bandwidth by reducing the clock rate of each of the plurality of transmitters; and
   a control;
   wherein
   the control allocates at least some of the adapted transmitters to the channel bandwidth at different carrier frequencies in the channel bandwidth for a parallel data transmission.

11. A system for data transmission, comprising:
   a transmission channel;
   an apparatus according to claim 10 for data transmission on the transmission channel; and
   a receiver for receiving the data transmitted via the transmission channel.

12. The system according to claim 11, wherein the transmission channel comprises an acoustic channel, a radio channel or any other multi-path communication channel.

13. The system according to claim 12, wherein the acoustic channel comprises drill rods, wherein a drill head, a sensor allocated to the drill head and the apparatus for data transmission are adapted to a first end of the drill rods, and wherein the receiver is arranged above ground.

* * * * *